United States Patent
Joo et al.

(10) Patent No.: US 9,141,643 B2
(45) Date of Patent: Sep. 22, 2015

(54) VISUAL ONTOLOGICAL SYSTEM FOR SOCIAL COMMUNITY

(75) Inventors: Sang Hyun Joo, Daejeon (KR); Il Kwon Jeong, Daejeon (KR); Bon Ki Koo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 365 days.

(21) Appl. No.: 13/550,822

(22) Filed: Jul. 17, 2012

(65) Prior Publication Data
US 2013/0021322 A1   Jan. 24, 2013

(30) Foreign Application Priority Data

Jul. 19, 2011   (KR) .................. 10-2011-0071623
Nov. 29, 2011   (KR) .................. 10-2011-0125829

(51) Int. Cl.
*G09G 5/00*   (2006.01)
*G06F 17/30*   (2006.01)
*G06T 11/60*   (2006.01)

(52) U.S. Cl.
CPC .......... *G06F 17/30268* (2013.01); *G06T 11/60* (2013.01); *G06T 2207/20212* (2013.01); *G06T 2207/20221* (2013.01)

(58) Field of Classification Search
USPC ............... 707/999.003; 717/124; 704/9; 455/556.1
See application file for complete search history.

(56) References Cited

U.S. PATENT DOCUMENTS

| | | |
|---|---|---|
| 2003/0120649 A1 | 6/2003 | Uchino et al. |
| 2007/0219968 A1* | 9/2007 | Frank ................ 707/999.003 |
| 2007/0288898 A1* | 12/2007 | Isberg ................ 717/124 |
| 2008/0189733 A1 | 8/2008 | Apostolopoulos |
| 2009/0076797 A1* | 3/2009 | Yu ................ 704/9 |
| 2009/0286570 A1* | 11/2009 | Pierce, Jr. ................ 455/556.1 |
| 2010/0177048 A1* | 7/2010 | Semenets et al. ........... 345/173 |
| 2011/0055336 A1* | 3/2011 | Park et al. ................ 709/206 |
| 2012/0047447 A1* | 2/2012 | Haq ................ 715/752 |

FOREIGN PATENT DOCUMENTS

KR   1020040028038 A   4/2004

* cited by examiner

*Primary Examiner* — Phi Hoang

(57) ABSTRACT

The present invention relates to a system for storing and managing a comment on content in a social community, and enabling another user to retrieve content or a comment. In particular, the present invention may generate image comments for target content from users of a social community, and summarize the generated imaged comments.

16 Claims, 7 Drawing Sheets

VISUAL ONTOLOGICAL SYSTEM FOR SOCIAL COMMUNITY

CROSS-REFERENCE TO RELATED APPLICATIONS

This application claims the benefit of Korean Patent Application No. 10-2011-0071623, filed on Jul. 19, 2011, and Korean Patent Application No. 10-2011-0125829, filed on Nov. 29, 2011 in the Korean Intellectual Property Office, the disclosures of which are incorporated herein by reference.

BACKGROUND

1. Field of the Invention

The present invention relates to a system for storing and managing comments on content in a social community, and other users retrieving the content or the comments.

2. Description of the Related Art

Various contents uploaded by a variety of users may be distributed via an online communication network. Here, users may obtain information associated with interests of the users by searching for content.

However, on occasion, content distributed via the online communication network may include a great amount of information, and may include irrelevant, unnecessary, low-grade, similar, duplicate, or unorganized information.

As such, research has been conducted into sorting useful information from pieces of information included in content through use of an automatic analysis scheme, a summarization scheme, a retrieval scheme, a tagging scheme, categorization scheme, and the like.

However, conventional schemes described in the foregoing may be useful for predetermined content, in general, for text content, or may involve an inconvenience of a user imputing operational instructions or data.

Nowadays, social network services (SNSs) are being used as a communication space for sharing information among a plurality of users. In such a setting, users may use a native language or an acquired language and thus, communication among users unfamiliar with a particular language may be difficult.

SUMMARY

According to an aspect of the present invention, there is provided an operating method of a virtual ontological system for a social community, the operating method including storing and maintaining, in a database, a plurality of expressions and image data associated with each of the plurality of expressions, collecting comments, input by users of the social community, about a predetermined content, generating comment images matching each of the comments based on image data associated with an expression included in the collected comments, and generating summarized image data for the predetermined content by analyzing the generated comment images.

The image data stored in the database may be associated with at least one expression in a predetermined language, or associated with expressions having the same meaning in at least two languages.

The image data stored in the database may include at least one of a video image, a three-dimensional (3D) object image, an animation image, and a character image.

The image data stored in the database may be grouped or managed in a hierarchical structure based on at least one expression and expressions associated with the at least one expression.

The generating of the summarized image data may include combining the generated comment images through at least one of a logical combination, a physical combination, and a chemical combination, and selecting, as the summarized image data, image data corresponding to a result of combining the generated comment images.

The generating of the summarized image data may include selecting duplicate images among all comment images generated for the predetermined content, and generating a single piece of summarized image data based on the duplicate images.

The generating of the summarized image data may include analyzing the comments about comment images, and selecting, as the summarized image data, a comment image mutually associated with the comments, or matching an expression corresponding to a superordinate concept.

The summarized image data may include attribute information among at least one of record information of a combination, a type of the combination, a number of counts, a name of an operand generated during an operation of generating the summarized image data.

When an additional comment on the predetermined content input by another user is collected from the social community or another social community, the operating method may further include generating a comment image matching the additional comment based on image data associated with an expression in the additional comment, and updating, using the comment image matching the additional comment, the summarized image data for the predetermined content.

The operating method may further include suggesting the image data stored in the database to at least one user of the social community, and recognizing a comment image matching a comment of the at least one user based on image data selected by the at least one user.

According to another aspect of the present invention, there is provided a virtual ontological system for a social community, the virtual ontological system including a database to store a plurality of expressions and image data associated with each of the plurality of expressions, a comment processing engine to collect comments, input by users of the social community, about a predetermined content, and generate comment images matching each of the comments based on image data associated with an expression included in the collected comments, and a combination engine to generate summarized image data for the predetermined content by analyzing the generated comment images.

The image data stored in the database may be associated with at least one expression in a predetermined language, or associated with expressions having the same meaning in at least two languages, the image data stored in the database may include at least one of a video image, a 3D object image, an animated image, and a character image, and the image data stored in the database may be grouped or managed in a hierarchical structure based on at least one expression and expressions associated with the at least one expression.

The combination engine may combine the generated comment images through at least one of a logical combination, a physical combination, and a chemical combination, and selects, as the summarized image data, image data corresponding to a result of combining the generated comment images.

The combination engine may select duplicate images among all comment images generated for the predetermined content, and generate a single piece of summarized image data based on the duplicate images.

The combination engine may analyze the comments about comment images, and select, as the summarized image data, a comment image mutually associated with the comments, or matching an expression corresponding to a superordinate concept.

Summarized image data may include attribute information among at least one of record information of a combination, a type of the combination, a number of counts, a name of an operand generated during an operation of generating the summarized image data.

When an additional comment on the predetermined content input by another user is collected from the social community or another social community, the comment processing engine may generate a comment image matching the additional comment based on image data associated with an expression in the additional comment, and the combination engine may update, using the comment image matching the additional comment, the summarized image data for the predetermined content.

The virtual ontological system may further include a computing terminal to display an augmented reality, recognize content from a screen taken through the augmented reality, and search for summarized image data matching the recognized content.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
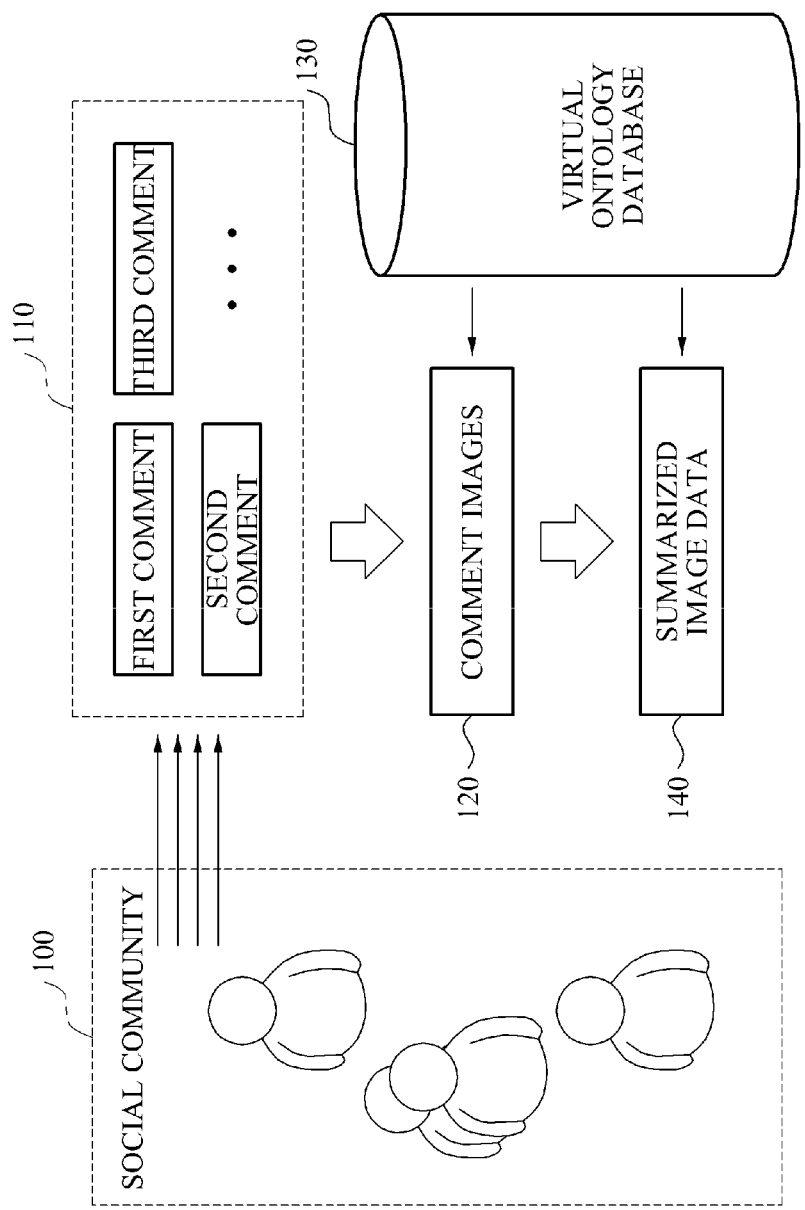
FIG. 1 is a diagram illustrating a basic scenario of a virtual ontological system for a social community according to embodiments of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 2:
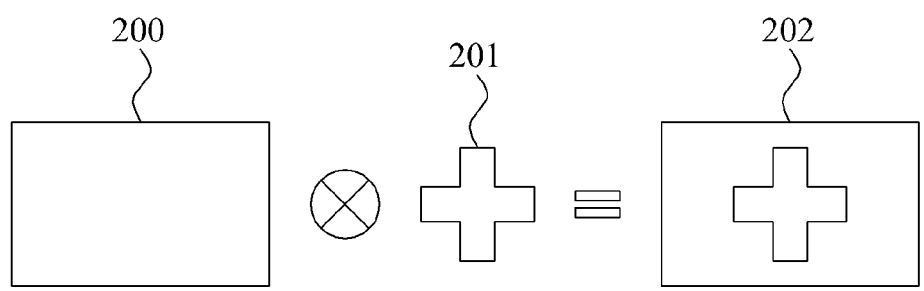
FIG. 2 is a diagram illustrating an example of combining comment images by a virtual ontological system for a social community according to embodiments of the present invention.

FIG. 1 is a diagram illustrating a basic scenario of a virtual ontological system for a social community according to embodiments of the present invention, and FIG. 2 is a diagram illustrating an example of combining comment images by a virtual ontological system for a social community according to embodiments of the present invention.

Referring to FIG. 1, a virtual ontological system may provide a social community service to users, or be linked with the social community service. The virtual ontological system may collect and manage contents and comments 110, from users of a social community 100, for each of the contents.

The virtual ontological system may include a virtual ontology database 130 corresponding to a database to perform an expression quantization on the comments from the users.

The virtual ontology database 130 may store and maintain a plurality of expressions used in a single language, and image data corresponding to each of the plurality of expressions.

The image data may be associated with at least one expression in a predetermined language, and may correspond to expressions having the same meaning in at least two languages, depending on embodiments. For example, image data ☺ may match "happy" in English, and may match both of "happy" and a derivative of "happy", for example, "happiness" according to an embodiment. The image data ☺ may match "bonheur" in French, "glück" in German, and "felicità" in Italian according to another embodiment. The virtual ontology database 130 may store image data matching each expression having the same meaning or similar meanings in at least one language of users.

The image data may be provided in a form of a video image, a three-dimensional (3D) object image, an animated image, and a character image. The image data may represent each expression, or express a meaning of each expression virtually. The image data may be grouped or managed in a hierarchical structure based on an expression corresponding to an object of matching the image data and derivatives of the expression.

The users may input text or tag information as a comment of the users for a predetermined content.

The virtual ontological system may analyze expressions included in the comments 110 input by the users, and read image data associated with each of the expressions from the virtual ontology database 130. The virtual ontological system may generate comment images 120 corresponding to each of the comments 110 using the read data image. Here, the generated comment images 120 may correspond to a combination or a set of pieces of image data for expressions included in each comment.

The virtual ontological system may combine the comment images 120 generated for each comment, and generate summarized image data 140 for a predetermined content using a result of the combination. That is, the virtual ontological system may combine a plurality of comment images generated for a predetermined content, and select combined image data as the summarized image data 140.

The virtual ontological system may analyze comment images generated for a predetermined content, and generate a single piece of summarized image data based on a result of the analysis. For example, the virtual ontological system may select duplicate images among all comment images generated for a predetermined content, and generate a single piece of summarized image data.

To combine the plurality of comment images described in the foregoing, the virtual ontological system may have a predetermined rule associated with an image combination and an image selection. The predetermined rule may correspond to at least one of a rule for logically combining the plurality of comment images, a rule for physically combining the plurality of comment images, and a rule for chemically combining the plurality of comment images.

1+2=3 (logical combination)

1+2=12 (physical combination)

1+2=X (chemical combination)

In particular, the logical combination may logically combine 1 and 2 to generate 3, the physical combination may physically combine 1 and 2 to generate 12, and the chemical combination may chemically combine 1 and 2 to generate X corresponding to new data. In this manner a combining logic may be applied to an image combination. For example, for the physical combination, the virtual ontological system may combine a comment image 200 and a comment 201 to generate an image 202 corresponding to a combination of the comment image 200 and the comment 201 as illustrated in FIG. 2.

The virtual ontological system may combine, using another rule, comment images corresponding to an object to be combined. For example, when a comment image corresponding to "awesome" and a comment image corresponding to "mountain" are to be combined, another comment image corresponding to "awesome mountain" may be selected as a combined image rather than directly combining each comment image. When a comment image corresponding to "flowers" and a comment image corresponding to "trees" are combined, the virtual ontological system may select, as a result of combination, a comment image mutually associated with "flowers" and "trees" or matching "botanical garden" corresponding to a superordinate concept. The virtual ontological system may regard a result of finally combining content as finally summarized image data.

Figure 3:
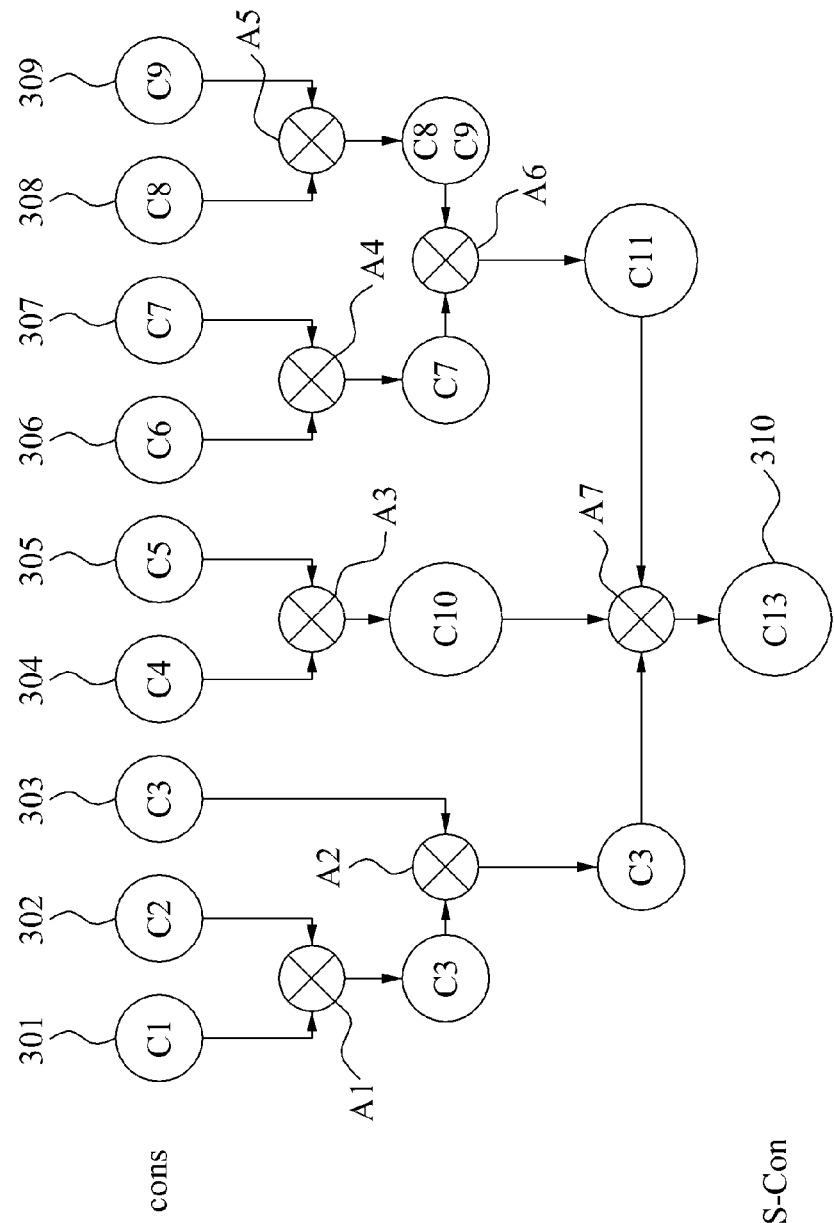
FIGS. 3 and 4 are diagrams illustrating an image combination in a virtual ontological system for a social community according to embodiments of the present invention.
Figure 4:
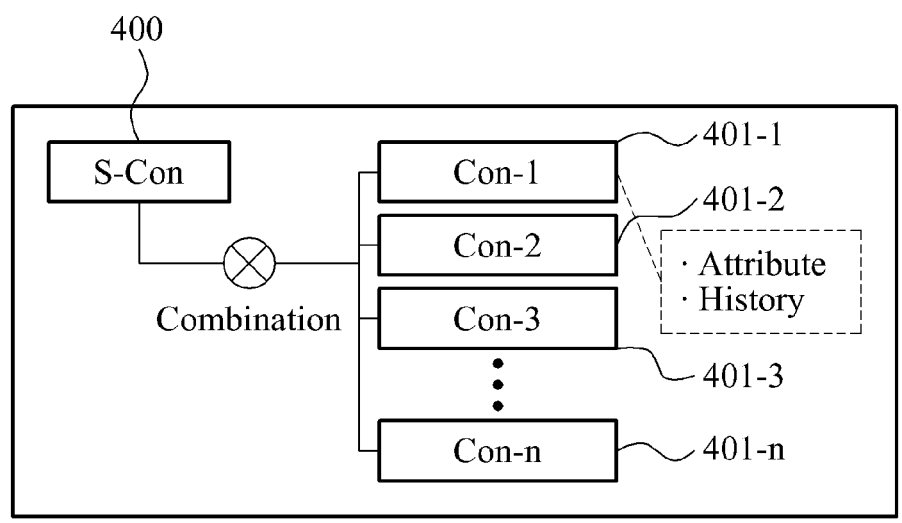

FIGS. 3 and 4 are diagrams illustrating an image combination in a virtual ontological system for a social community according to embodiments of the present invention.

Referring to FIG. 3, cons may refer to comment images (C1 through C9) 301 through 309 of comments for a predetermined content, and S-Con may refer to finally summarized image data. A virtual ontological system according to embodiments of the present invention may successively combine the comment images (C1 through C9) 301 through 309 using a combining scheme described in the foregoing, and output summarized image data 310 as a result of combination. An operation of performing the combination may be expressed in a tree shape as illustrated in FIG. 3, and at least one combination A1 through A7 may be performed in the operation.

The virtual ontological system according to embodiments of the present invention may analyze the comment images (C1 through C9) 301 through 309 generated for each comment, and generate a single piece of summarized image data based on a result of analysis. For example, image data duplicated at a greatest number of instances among the comment images (C1 through C9) 301 through 309 generated for each comment may be selected as another summarized image data.

The virtual ontological system according to embodiments of the present invention may set information associated with the S-Con while generating the S-Con.

Referring to FIG. 4, summarized image data S-Con 400 may include attribute information among at least one of record information of a combination, a type of the combination, a number of instances during which counting is performed, a name of an operand generated during an operation of generating the summarized image data S-Con 400. That is, the summarized image data S-Con 400 may correspond to image data corresponding to a combination of comment images (Con-1 through Con-n) 401-1 through 401-*n*. Here, the virtual ontological system may include, as an attribute or a history, information among at least one of record information of the combination, information about a type of the combination, information associated with a type of data, for example, text, an image, an audio, a video, a 3D object, an animation, and the like, a number of instances during which counting is performed, a name of an operand, a combining scheme, for example, a logical combination, a physical combination, a chemical combination, and the like.

Figure 5:
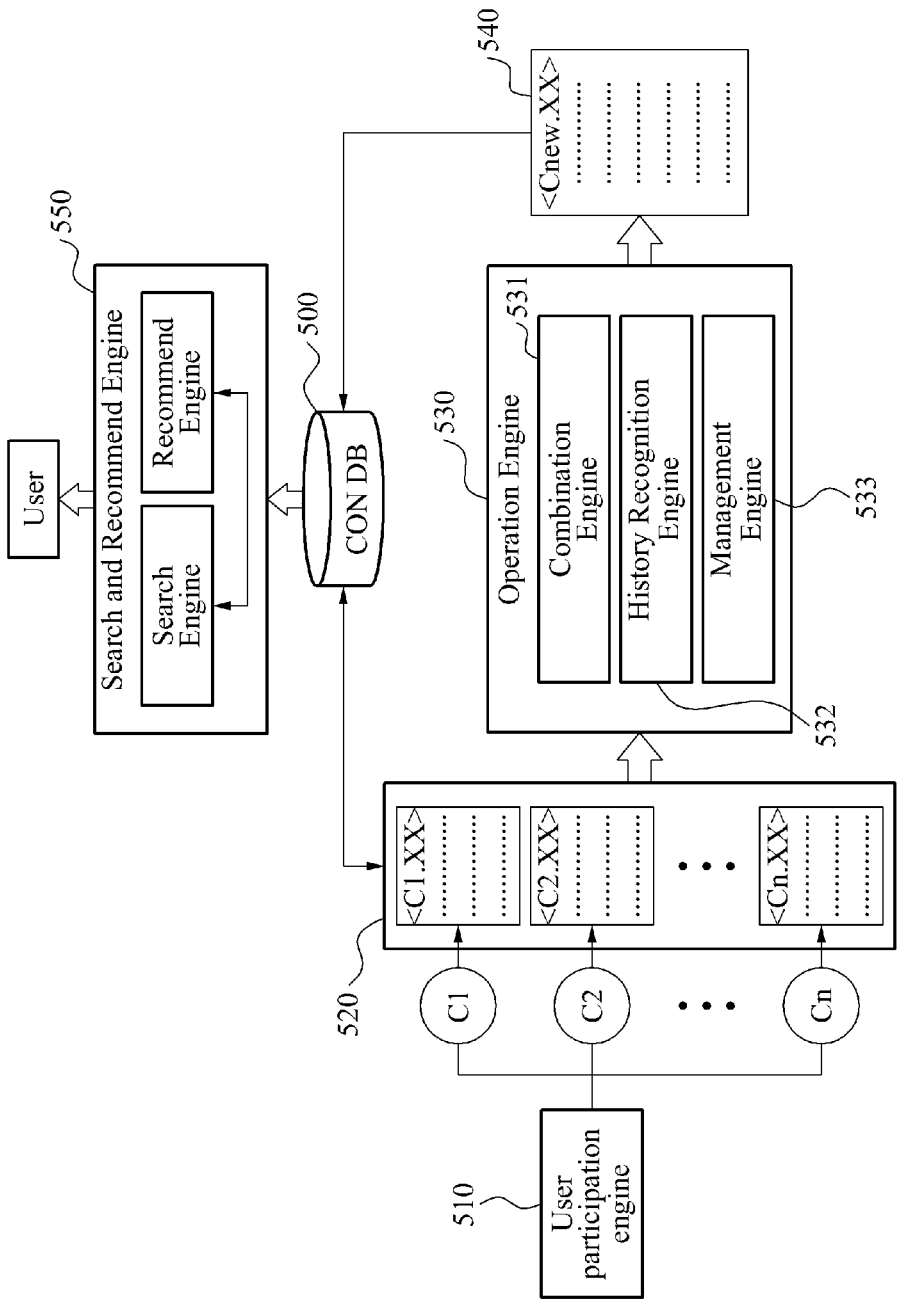
FIG. 5 is a diagram illustrating an example of a configuration providing a service framework of a virtual ontological system for a social community according to embodiments of the present invention.

FIG. 5 is a diagram illustrating an example of a configuration providing a service framework of a virtual ontological system for a social community according to embodiments of the present invention.

Referring to FIG. 5, users of a social network may input a comment of the users for a predetermined content. A comment process engine 520 may collect comments C1 through Cn from a user participation engine 510, and search for image data associated with each expression in a database CON DB 500 based on expressions included in the collected comments C1 through Cn. The comment process engine 520 may generate a comment image based on image data obtained as a result of search, and deliver the generated comment image to an operation engine 530.

The operation engine 530 may receive delivered comment image, and generate a single piece of summarized image data 540 using internal devices.

In particular, the operation engine 530 may include a combination engine 531. The combination engine 531 may generate a single piece of summarized image data from a plurality of comment images based on an analyzing scheme or a combining scheme described in the foregoing.

The operation engine 530 may further include a history recognition engine 532. The history recognition engine 532 may manage a combination record of the combination engine 531, and provide the combination engine 531 with record information used for combination.

The operation engine 530 may further include a management engine 533. The management engine 533 may control an overall operation of the operation engine 530, and in particular, control an operation of the operation engine 530 based on an input of a manager.

Summarized image data generated by the operation engine 530 may be stored in the database CON DB 500. The database CON DB 500 may store pieces of summarized image data for a plurality of contents, and provide the pieces of summarized image data to users via a search and recommend engine 550. A user may access summarized image data matching each content stored in the database CON DB 500 via the search and recommend engine 550.

Figure 6:
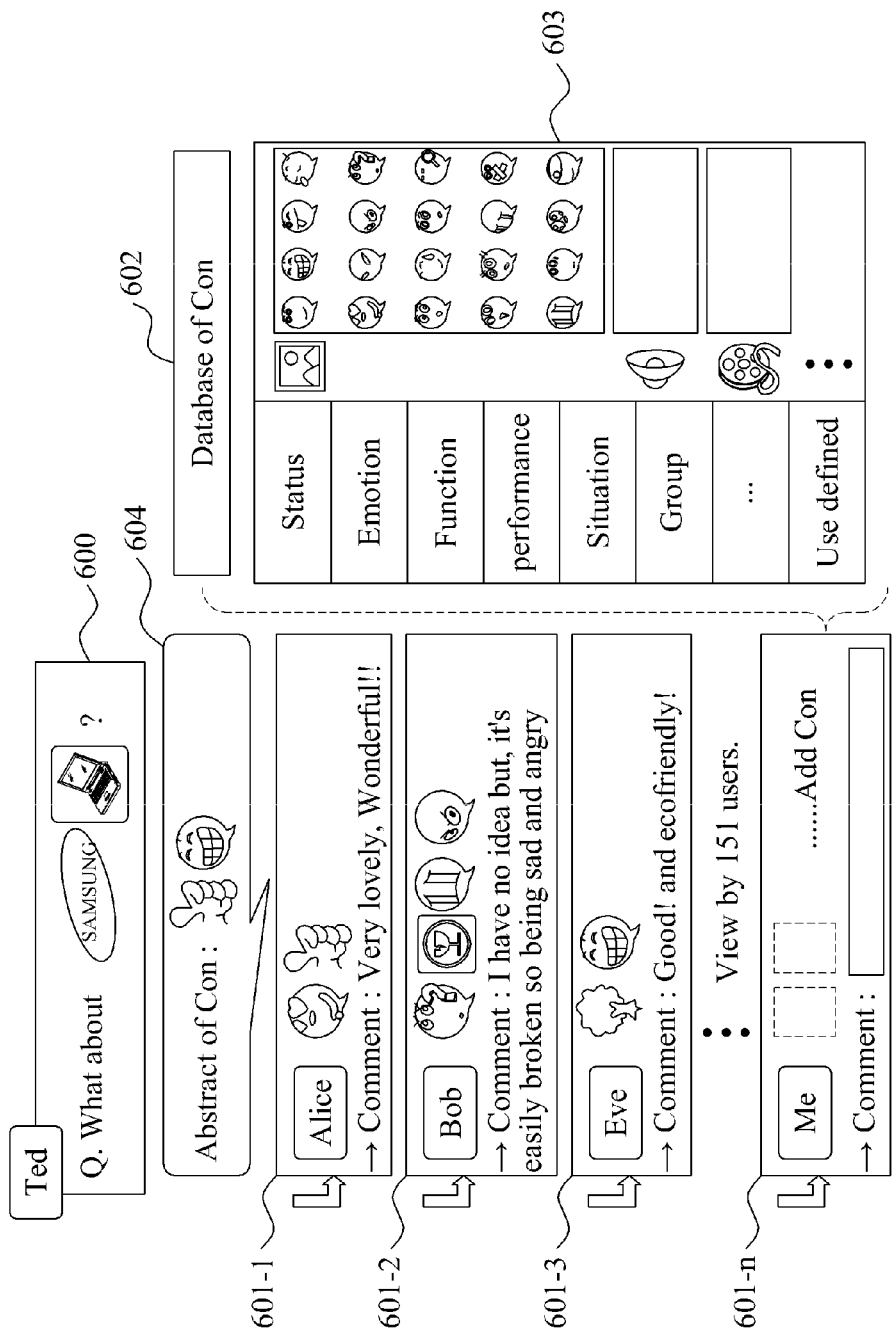
FIG. 6 is a diagram illustrating an example of an interface that may be provided by a virtual ontological system for a social community according to embodiments of the present invention.

FIG. 6 is a diagram illustrating an example of an interface that may be provided by a virtual ontological system for a social community according to embodiments of the present invention.

Referring to FIG. 6, a virtual ontological system according to embodiments of the present invention may provide an interface for enabling users of a social community to input a comment of the users for a predetermined content 600.

For example, when the predetermined content 600 corresponds to an inquiry about a laptop computer manufactured by a predetermined company, the users, for example, Alice, Bob, Eve, and the like may input comments 601-1 through 601-*n* indicating opinions of the users for the inquiry. The comments 601-1 through 601-*n* may include text.

The virtual ontological system according to embodiments of the present invention may read image data associated with an expression within each input comment based on images stored in a Database of Con 602. The virtual ontological system may select and generate a comment image for each comment using the read image data. As illustrated in a window 603, the Database of Con 602 may itemize, group, and store image data matching each expression.

The virtual ontological system may generate an Abstract of Con 604 corresponding to a single piece of summarized image data by combining comment images matching a user comment.

When users in a social community input a comment of the users, the virtual ontological system may suggest image data stored in the Database of Con 602 so that the users may select image data directly. In particular, the users in the social community may correspond to people using a variety of languages. The image data stored in the Database of Con 602 may match expressions having the same meaning for each language, or expressions associated with each language and thus, the virtual ontological system may smoothly generate and combine comment images even though the users use different languages.

The virtual ontological system may analyze comment images of users when generating summarized image data, and generate the summarized image data including image data duplicated at a greatest number of instances among each comment image.

Figure 7:
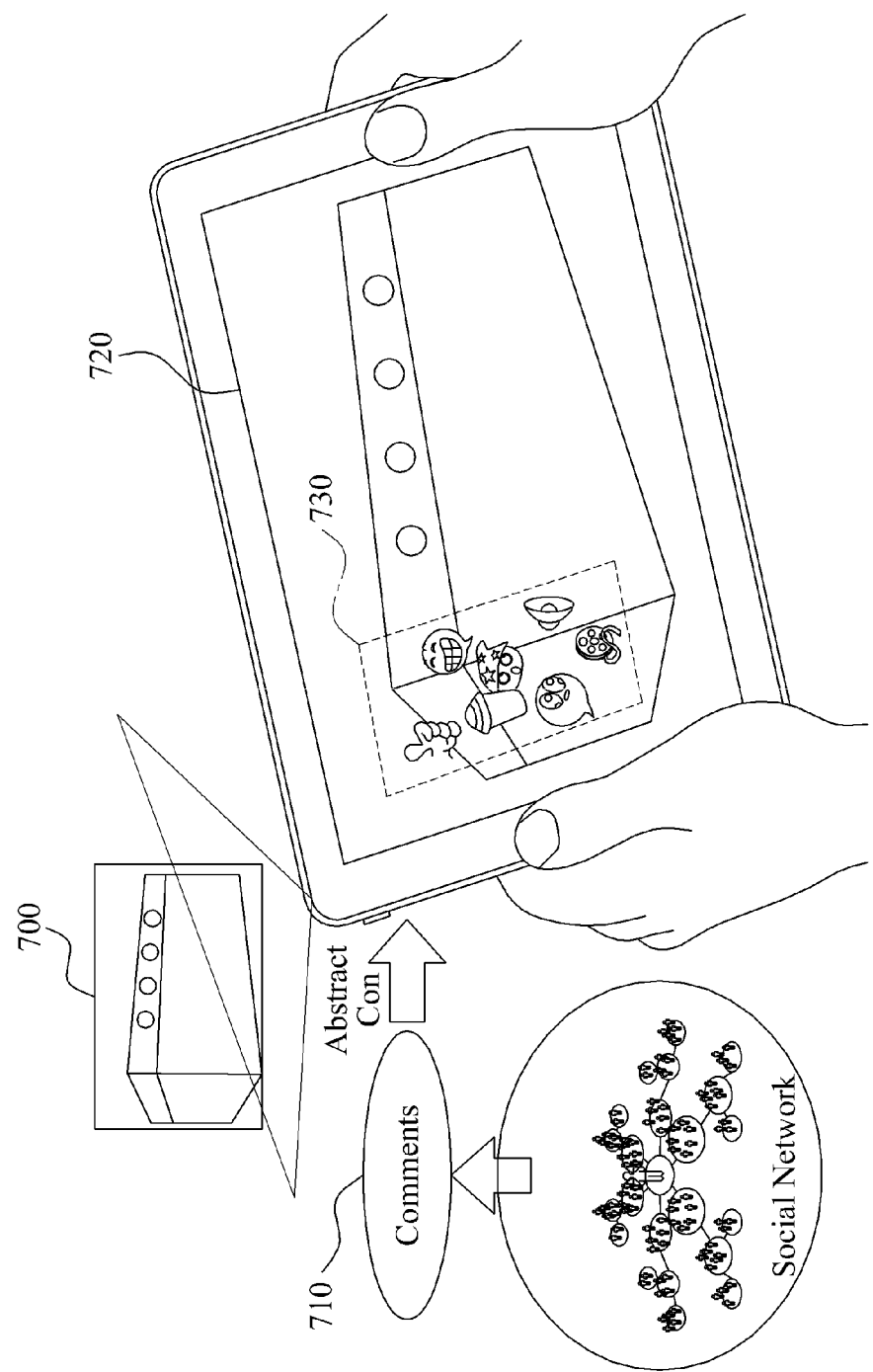
FIG. 7 is a diagram illustrating an example of an interface that may be provided by a virtual ontological system for a social community according to embodiments of the present invention.

FIG. 7 is a diagram illustrating an example of an interface that may be provided by a virtual ontological system for a social community according to embodiments of the present invention.

Referring to FIG. 7, a virtual ontological system according to embodiments of the present invention may provide an interface linked with an augmented reality function.

A user of a social community may select a content 700, for example, Starbucks via a screen 720 displaying an augmented reality, and input a comment 710 corresponding to image data, or select image data.

In response to the user inputting a comment, the virtual ontological system may generate a comment image matching the comment input by the user, and combine the generated comment image and a comment image of another user, thereby generating summarized image data for content. Another user may search for and access the generated summarized image data.

The other user may view summarized image data 730 for content through a screen 720 for displaying the augmented reality.

For example, in response to the user taking content through a computing terminal displaying the augmented reality, the other user may recognize the content, and deliver a result of recognition to the virtual ontological system. The virtual ontological system may search for summarized image data matching the content, and deliver the summarized image data to the computing terminal Thus, a user may verify the summarized image data 730 of desired content, for example, Starbucks through the augmented reality.

Accordingly, the user may instinctively recognize comments for content input by people of a social community through a summarized image rapidly expressing the comments. Even though a person using a different language in the social community inputs a comment, the user may instinctively recognize the comment through an image expressing the comment input in a different language.

The user may recognize an opinion on content of the social community through the augmented reality, thereby rapidly recognizing and ordering an item from a menu, for example, a drink recommended in the social community at a place such as Starbucks.

The above-described exemplary embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An operating method of a virtual ontological system for a social community, the operating method comprising:
   storing and maintaining, in a database, a plurality of quantizing expressions having respective meanings and image data associated with each of the plurality of quantizing expressions;
   collecting a plurality of comments, input by users of the social community, about a predetermined content, the comments including a plurality of user expressions;
   determining, for each of the plurality of user expressions, a matching quantizing expression in the database according to the meaning of the matching quantizing expression and a meaning of the user expression;
   generating comment images for each of the user expressions according to the image data associated with the respective matching quantizing expression in the database; and
   generating summarized image data for the predetermined content by analyzing the generated comment images,
   wherein generating the summarized image data comprises:
   combining the generated comment images through at least one of a logical combination, a physical combination, and a chemical combination, and selecting, as the summarized image data, image data corresponding to a result of combining the generated comment images.

2. The operating method of claim 1, wherein each of the image data stored in the database is associated with at least one natural language expression in a predetermined language, or associated with natural language expressions having the same meaning in at least two languages.

3. The operating method of claim 1, wherein the image data stored in the database comprises at least one of a video image, a three-dimensional (3D) object image, an animation image, and a character image.

4. The operating method of claim 1, wherein the image data stored in the database is grouped or managed in a hierarchical structure based on at least one expression and expressions associated with the at least one expression.

5. The operating method of claim 1, wherein the generating of the summarized image data comprises:
selecting duplicate images among all comment images generated for the predetermined content, and generating a single piece of summarized image data based on the duplicate images.

6. The operating method of claim 1, wherein the generating of the summarized image data comprises:
analyzing the comments about comment images, and selecting, as the summarized image data, a comment image mutually associated with the comments, or matching an expression corresponding to a superordinate concept.

7. The operating method of claim 1, wherein the summarized image data includes attribute information among at least one of record information of a combination, a type of the combination, a number of instances during which counting is performed, a name of an operand generated during an operation of generating the summarized image data.

8. The operating method of claim 1, wherein, when an additional comment on the predetermined content input by another user is collected from the social community or another social community, the operating method further comprises:
generating an additional comment image based on image data associated with an additional quantizing expression in the database, the additional quantizing expression having a meaning matching a user expression in the additional comment; and
updating, using the additional comment image, the summarized image data for the predetermined content.

9. The operating method of claim 1, further comprising:
suggesting the image data stored in the database to at least one user of the social community, and recognizing a comment image matching a comment of the at least one user based on image data selected by the at least one user.

10. A virtual ontological system for a social community, the virtual ontological system comprising:
a database configured to store a plurality of quantizing expressions having respective meanings and image data associated with each of the plurality of quantizing expressions;
a comment processing engine configured to collect a plurality of comments, input by users of the social community, about a predetermined content, and to generate one or more comment images for each of the comments based on image data associated with one or more of the plurality of quantizing expression, wherein the meaning of each of the one or more of the plurality of quantizing expressions matches a meaning of a user expression included in the respective comment; and
a combination engine configured to generate summarized image data for the predetermined content by analyzing the generated comment images,
wherein the combination engine is configured to combine the generated comment images through at least one of a logical combination, a physical combination, and a chemical combination, and to select, as the summarized image data, image data corresponding to a result of combining the generated comment images.

11. The virtual ontological system of claim 10, wherein:
the image data stored in the database is associated with at least one natural language expression in a predetermined language, or associated with natural language expressions having the same meaning in at least two languages,
the image data stored in the database comprises at least one of a video image, a three-dimensional (3D) object image, an animation image, and a character image, and
the image data stored in the database is grouped or managed in a hierarchical structure based on at least one expression and expressions associated with the at least one expression.

12. The virtual ontological system of claim 10, wherein the combination engine is configured to select duplicate images among all comment images generated for the predetermined content, and to generate a single piece of summarized image data based on the duplicate images.

13. The virtual ontological system of claim 10, wherein the combination engine is configured to analyze the comments about comment images, and to select, as the summarized image data, a comment image mutually associated with the comments, or matching an expression corresponding to a superordinate concept.

14. The virtual ontological system of claim 10, wherein summarized image data includes attribute information among at least one of record information of a combination, a type of the combination, a number of instances during which counting is performed, a name of an operand generated during an operation of generating the summarized image data.

15. The virtual ontological system of claim 10, wherein:
the comment processing engine is configured to collect an additional comment on the predetermined content input by another user from the social community or another social community,
the comment processing engine is configured to generate an additional comment image matching the additional comment based on image data associated with an additional quantizing expression having a meaning matching an user expression in the additional comment, and
the combination engine is configured to update, using the additional comment image, the summarized image data for the predetermined content.

16. The virtual ontological system of claim 10, further comprising:
a computing terminal configured to display an augmented reality, recognize content from a screen taken through the augmented reality, and search for summarized image data matching the recognized content.

* * * * *